April 16, 1963 T. R. THOMSEN 3,086,158
PULSE PRODUCING CIRCUIT FROM A.C. SOURCE
Filed May 23, 1960

INVENTOR.
THEODORE R. THOMSEN
BY
Woodhams Blanchard and Flynn
ATTORNEYS

United States Patent Office 3,086,158
Patented Apr. 16, 1963

3,086,158
PULSE PRODUCING CIRCUIT FROM
A.C. SOURCE
Theodore R. Thomsen, Farmington, Mich., assignor to Robotron Corporation, Detroit, Mich., a corporation of Michigan
Filed May 23, 1960, Ser. No. 31,027
4 Claims. (Cl. 320—1)

This invention relates to an electrical circuit for supplying current to a load and, particularly, relates to an improved circuit for supplying a load with high amperage, short duration pulses of alternating polarity from an alternating potential source.

In certain types of operations, it is desirable to supply current to a load in the form of high amperage, short duration pulses of alternating polarity. It has been suggested to employ a single capacitor which operates in conjunction with a switch in such a fashion that it discharges from a previously charged condition and then is charged in the opposite polarity during each half-cycle of the alternating potential source. Said switch normally includes two power tubes connected in back-to-back relationship. While this system is highly satisfactory and effective in operation, in a continuing effort to improve upon this system and to increase its utility, it has been found to be advantageous in certain circumstances to use two capacitors each associated with one power tube and arranged in such a fashion that each capacitor in an initially uncharged condition is charged for approximately the first 90 degrees of one half-cycle of the alternating potential source and is then discharged on the following half-cycle whereupon the cycle repeats. The capacitors are charged and discharged on alternate half cycles and each capacitor is charged in only one polarity. The present invention is directed to a circuit using two capacitors and operating in this fashion.

The present invention arose particularly in connection with the welding industry and, for illustrative purposes, the following description will proceed primarily with reference thereto. However, it will be understood that the invention is also useful for other purposes, such as in the electroplating industry, and the scope of the invention shall be construed accordingly.

Accordingly, it is an object of this invention to provide an improved circuit for transmitting short, high amperage pulses of alternating polarity to a load, particularly to a welding transformer.

It is a further object of this invention to provide an improved circuit, as aforesaid, which utilizes two capacitors which are alternately charged during a predetermined portion of half-cycles of the alternating potential source and are respectively discharged during the half-cycle following that in which they were respectively charged.

It is a further object of this invention to provide an improved circuit, as aforesaid, which is simple in construction, which utilizes inexpensive, readily available parts and which is inexpensive to manufacture and reliable in operation.

Other objects and advantages of the invention will become apparent to persons acquainted with circuits of this type upon reading the following description and inspecting the accompanying drawings, in which.

In general, the invention provides an electrical circuit including a source of alternating potential connected through two parallel circuits to an inductive and resistive load which is in this case the primary winding of a welding transformer. The first circuit includes a capacitor and an electric valve means with one set of corresponding ends thereof connected to the opposite ends of the primary winding of the welding transformer and the other set of corresponding ends thereof connected through a rectifier to one side of the alternating potential source. The rectifier and valve means are sensed to transmit a pulse of one polarity through the primary winding when the valve means is conductive. The second circuit includes the same elements that comprise the first-mentioned circuit but the rectifier and valve means thereof are sensed so that a pulse of the opposite polarity is transmitted through the primary winding when the second valve means is conductive. Phase shift means are provided for rendering the first and second valve means conductive during opposite half-cycles of the alternating potential source. The two circuits each operate in such fashion that the capacitor thereof is charged during one of the half-cycles of the alternating potential source and is then discharged through the valve means of said circuit and the primary winding during the following half-cycle of the source.

Detailed Description

Figure 1:
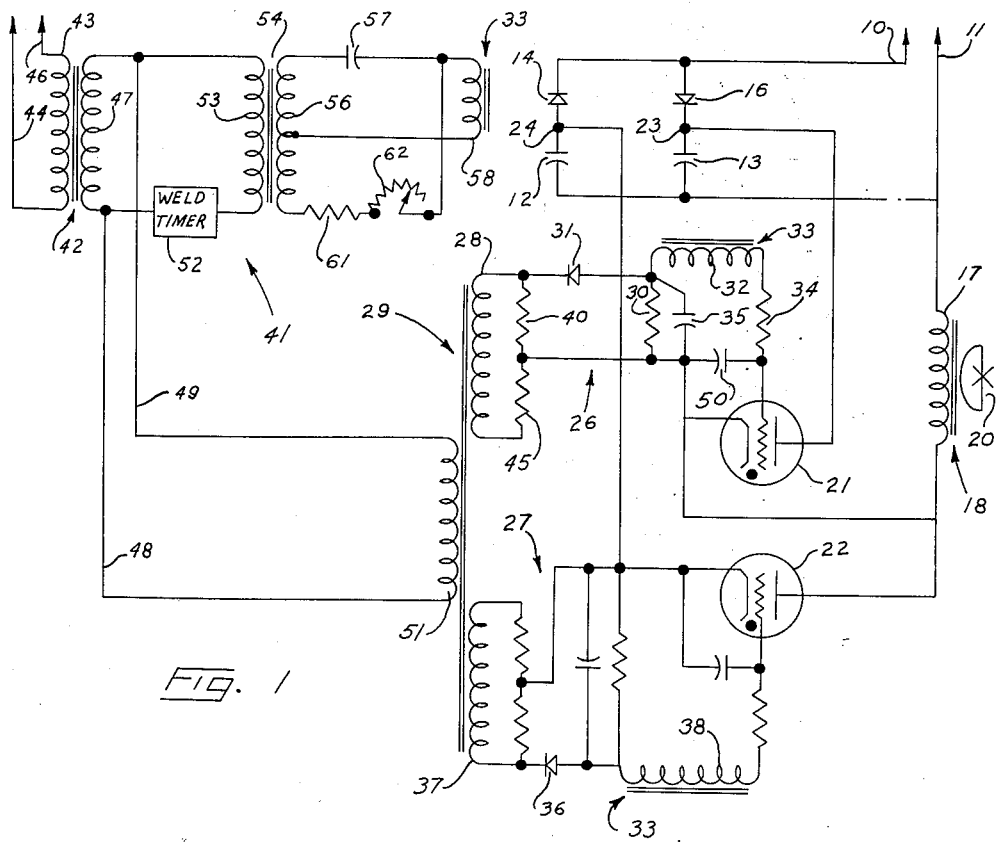
FIGURE 1 is a circuit diagram showing the circuit to which the invention relates.

Referring to FIGURE 1, the circuit comprises a pair of line conductors 10 and 11 connected to an A.C. source and which are also connected to two parallel circuits including capacitors 12 and 13 and rectifiers 14 and 16 connected, respectively, in series therewith. The rectifiers 14 and 16 are oppositely sensed so that the capacitors 12 and 13 are charged during alternate half-cycles of the alternating potential source.

The line conductor 11 is also connected to one end of the primary winding 17 of a welding transformer 18 The secondary winding of the welding transformer 18 is connected to the welding electrodes 20 in a conventional manner.

A pair of power tubes 21 and 22, here shown as thyratrons, are provided. The cathode of power tube 21 and the anode of power tube 22 are connected to the other end of the primary winding 17 of the welding transformer 18. A junction point 23 between the capacitor 13 and rectifier 16 is connected to the anode of power tube 21. A junction point 24 between the capacitor 12 and rectifier 14 is connected to the cathode of power tube 22. Thus, when the capacitor 13 is charged the positive side thereof is connected to the anode of tube 21 and when capacitor 12 is charged the negative side thereof is connected to the cathode of tube 22.

The power tubes 21 and 22 are normally biased to cut off by suitable biasing means, here rectifier circuits 26 and 27, respectively. The rectifier circuit 26 is of the half-wave, capacitor-input type to which alternating potential is supplied by the secondary winding 28 of the transformer 29. One side of a rectifier 31 is connected to one end of secondary winding 28 and to a resistance 40 and the other side thereof is connected to a resistance 30 and a capacitor 35 which are connected in parallel. A secondary winding 32 of a transformer 33 and a grid resistor 34 are connected in series to the control electrode of the power tube 21. A conductor connects the other side of resistance 30 and capacitor 35 and the cathode of the tube 21 to a point between resistances 40 and 45 and thence through resistance 45 to the other end of secondary winding 28. The rectifier circuit applies a continuous negative potential in a well-known manner on the control electrode of tube 21 to bias same at cutoff. However, when transformer 33 is energized by alternating potential as described hereinafter, positive half-cycles thereof will overcome this bias and permit tube 21 to fire. Capacitor 50 is connected between the control electrode and cathode of tube 21 to prevent false operation thereof due to surges in the power supply.

The rectifier circuit 27 is identical with the rectifier 26 previously discussed and includes a rectifier 36 connected for being energized by another secondary winding 37 of the transformer 29. The rectifier 36 is connected through another secondary winding 38 of the transformer 33 to the control electrode of the power tube 22 to normally bias said tube at cutoff. This bias is overcome to cause firing of tube 22 when transformer 33 is energized.

A control circuit 41 is provided to supply the potential which normally biases the power tubes 21 and 22 at cutoff and to supply, under control of a timing circuit, potential for overcoming the biasing potential. The control circuit 41 includes a transformer 42 whose primary winding 43 is connected to a pair of line conductors 44 and 46 which are in turn connected to an A.C. source. This A.C. source may be the same as that which supplies lines 10 and 11 and at least is in phase with the source supplying lines 10 and 11. The secondary winding 47 of the transformer 42 is connected by conductors 48 and 49 to the primary winding 51 of transformer 29. Thus, with potential applied to lines 44 and 46, the transformer 29 is energized and supplies via the rectifier circuits 26 and 27 a negative potential biasing the tubes 21 and 22 to a nonconductive condition. The secondary winding 47 of the transformer 42 is also connected through a weld timer circuit 52 of any suitable type so that it energizes the primary winding 53 of the transformer 54 at selected times as determined by the operation of the weld timer circuit 52. The secondary winding 56 of the transformer 54 is connected at one end thereof through a capacitor 57 to one end of the primary winding 58 of the transformer 33 whose secondary windings 32 and 38 are connected to the control electrodes of the power tubes 21 and 22 previously described. The other end of the primary winding 58 is connected to a center tap on the secondary winding 56. The other end of the secondary winding 56 is connected through a fixed resistance 61 and an adjustable resistance 62 to the first-mentioned end of the primary winding 58. The circuitry including the secondary winding 56, capacitor 57, primary winding 58, adjustable resistance 62 and resistance 61 defines a resistance-capacitance phase shift circuit of conventional construction for energizing the transformer 33 and thereby supplying positive potential to the control electrodes of power tubes 21 and 22 to render same conductive at a preselected time during, respectively, opposite half-cycles of the alternating potential source.

*Operation*

While the operation of the circuit has been indicated somewhat above, it will be further described in order to insure a complete understanding of the invention.

Figure 2:
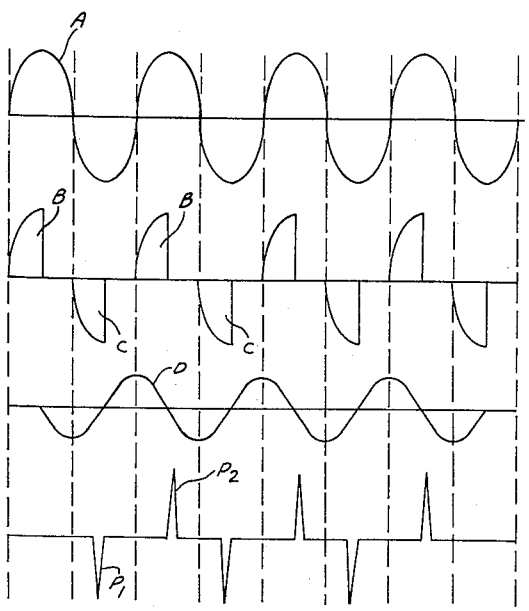
FIGURE 2 is a time vs. voltage diagram illustrating the voltage relationships on selected portions of the circuit at different times.

Alternating potential applied to the conductors 10 and 11 is indicated by line A in FIGURE 2. This potential effects charging of the capacitors 12 and 13 on opposite half-cycles of the alternating potential source. The capacitors are charged during substantially about 90 degrees of respective half-cycles. The charge on the capacitor 12 is indicated by the areas B and the areas C represent the charge on capacitor 13 (FIGURE 2). The capacitors cease to charge at the peak of the respective half-cycles on which they are charged and they are maintained in the charged condition because of the presence of the rectifiers 14 and 16 in circuit therewith.

The power tubes 21 and 22 are normally maintained nonconductive by potential supplied from the transformer 29 through the rectifier circuits 26 and 27. Upon suitable operation of the weld timer circuit 52 the primary winding of transformer 54 is energized and thereby supplies potential to the primary winding of the transformer 33. This potential is phase shifted with respect to the phase of the alternating potential source. This phase-shifted potential is applied to the secondary windings 32 and 38 of transformer 33 to move the control electrodes of power tubes 21 and 22 positive to permit conduction thereof during opposite half-cycles of the alternating potential source. The line D in FIGURE 2 indicates the potential applied to the control electrodes of the power tubes 21 and 22. From this it will be seen that tube 22 becomes conductive at approximately the midpoint of the negative half-cycle of the alternating potential source while tube 21 becomes conductive at about the midpoint of the positive half-cycle of the alternating potential source. When tube 22 is conductive, the energy stored in capacitor 12 is discharged therethrough and through the primary winding 17 of the welding transformer 18. Thus, a pulse $P_1$ (FIGURE 2) of negative polarity is transmitted through the primary winding 17. When tube 21 becomes conductive the energy stored in capacitor 13 travels through the primary winding 17 in the opposite direction and through the tube to discharge the capacitor. This provides the pulse $P_2$ (FIGURE 2) through the primary winding in the opposite direction. Thus, during each half-cycle, a pulse of short duration and high amperage is passed through the primary winding 17 and supplies energy to the welding electrodes. The pulses through the welding electrodes are of alternating polarity.

While the disclosed circuit utilizes power tubes 21 and 22 which are here shown as being thyratrons, it will be apparent to those skilled in the art that the invention is equally adapted for use in situations where ignitrons are used as the power tubes. In this case, the rectifier circuits 26 and 27 would control the firing of thyratrons which in turn would control the conduction of the ignitrons in a manner customary in high current welding systems.

While a particular preferred embodiment of the invention has been disclosed, it will be apparent that the invention contemplates such changes or modifications therein as lie within the scope of the appended claims.

What is claimed is:

1. A circuit for supplying welding current comprising: a source of alternating potential; a welding transformer having a primary winding, one end of said primary winding being connected to one side of said source; a pair of parallel circuits; each of said circuits including a rectifier and a capacitor connected in series between the other side of said source and said one end of said primary winding and also including electric valve means having one of its principal electrodes connected to a point between said rectifier and said capacitor and having its other principal electrode connected to the other end of said primary winding, the valve means and the rectifier in one of said parallel circuits being connected in opposite polarity with respect to the valve means and the rectifier in the other circuit; and means operable in predetermined phase relation to the alternating potential supplied by said source for rendering said valve means conductive alternately during opposite half-cycles of the alternating potential.

2. A circuit for supplying welding current comprising: a source of alternating potential; a welding transformer having a primary winding, one end of said primary winding being connected to one side of said source; a pair of valve means connected in parallel and reverse polarity with principal electrodes of opposite polarity connected to the other end of said primary winding; a pair of oppositely sensed rectifying means connected, respectively, in series between the other principal electrodes of said valve means and the other side of said source; a pair of capacitors connected, respectively, between the other principal electrodes of said valve means and said one end of said primary winding; and means for rendering said valve means conductive alternately during opposite half-cycles of the alternating potential.

3. A circuit for supplying energy to a load comprising: a source of alternating potential; a transformer having a primary winding; a pair of capacitors; rectifier means connected between said source and said capacitors for charging said capacitors alternately by potential from said source, one capacitor being charged during one half-cycle of said source and the other capacitor being charged on the following half-cycle; a pair of electric valve means having control electrode means for controlling the conductivity thereof, each valve means being connected in circuit with one of said capacitors and with said primary winding so that its associated capacitor will be discharged through said primary winding when said valve means is conductive; and means for supplying an alternating control potential to the control electrode means of both of said valve means for rendering said valve means conductive alternately during the respective half-cycles of said control potential, said control potential being in predetermined phase relation to the alternating potential supplied by the source so that each capacitor will be discharged through the primary winding during the half-cycle of the source following that in which it was charged.

4. A circuit for supplying current to a load, comprising: a source of alternating potential; a transformer having a primary winding; a first circuit including a first, half-wave rectifier connected at one side thereof to one side of said source, a first capacitor connected in series with said first rectifier so that one terminal of said capacitor will be charged positive with respect to the other thereof, first electric valve means having anode, cathode and a control electrode, said one terminal of said capacitor and said anode being connected to each other and said other terminal being connected through said primary winding to said cathode; a second circuit including a second, half-wave rectifier connected at one side thereof to said one side of said source and in parallel with said first half-wave rectifier and of opposite polarity with respect thereto, a second capacitor connected in series with said second rectifier so that one terminal of said second capacitor will be charged positive with respect to the other thereof, second electric valve means having an anode and cathode and a control electrode, said other terminal of said second capacitor being connected to the cathode of said second valve and said one terminal of said second capacitor being connected through said primary winding with said anode of said second valve; and means for rendering said first and second valve means conductive alternately during opposite half-cycles of the alternating potential, so that the capacitors are charged during opposite half-cycles of said source and are discharged through said primary winding on the half-cycle following that during which they are charged.

References Cited in the file of this patent
UNITED STATES PATENTS

| | | |
|---|---|---|
| 2,472,110 | Klemperer | June 7, 1949 |
| 2,508,708 | Dawson | May 23, 1950 |